United States Patent

Morita et al.

[11] Patent Number: 5,248,435
[45] Date of Patent: Sep. 28, 1993

[54] ION EXCHANGE RESIN, PROCESS FOR PRODUCING THE SAME, AND METHOD FOR REMOVING IMPURITIES FROM CONDENSATE

[75] Inventors: Takamitsu Morita, Kanagawa; Junya Watanabe, Tokyo; Shintaro Sawada, Kanagawa, all of Japan

[73] Assignee: Mitsubishi Kasei Corporation, Tokyo, Japan

[21] Appl. No.: 808,500

[22] Filed: Dec. 17, 1991

[51] Int. Cl.⁵ .............................................. C02F 1/42
[52] U.S. Cl. ...................................... 210/681; 521/28
[58] Field of Search ............... 210/638, 681; 521/28, 521/56, 64; 428/402.22

[56] References Cited

U.S. PATENT DOCUMENTS

| | | | |
|---|---|---|---|
| 4,152,496 | 5/1979 | Barrett et al. | 531/139 |
| 4,419,245 | 12/1983 | Barrett et al. | 210/681 |
| 4,975,201 | 12/1990 | Ma | 210/686 |

*Primary Examiner*—Frank Spear
*Attorney, Agent, or Firm*—Sughrue, Mion, Zinn, Macpeak & Seas

[57] ABSTRACT

A process for producing an ion exchange resin having a specific surface area of at least 0.04 m²/g, an ion exchange resin produced by the process, and a method for removing ionic and noinionic impurities from a condensate by means of the ion exchange resin produced by the process. The process comprises the steps of: (1) uniformly imbibing a monomer mixture comprising a bifunctional unsaturated aromatic monomer and a monofunctional unsaturated aromatic monomer into aromatic crosslinked copolymer particles comprising a monofunctional unsaturated aromatic monomer and a bifunctional unsaturated aromatic monomer and having a porosity of not more than 0.2 ml/g; (2) polymerizing the monomer mixture in the presence of a polymerization initiator; and (3) introducing an ion exchange group into the resulting copolymer particles. The ion exchange resin has a large specific surface area and high physical strength and is capable of removing both ionic and noinionic impurities from a condensate.

23 Claims, 1 Drawing Sheet

ION EXCHANGE RESIN, PROCESS FOR PRODUCING THE SAME, AND METHOD FOR REMOVING IMPURITIES FROM CONDENSATE

FIELD OF THE INVENTION

The present invention relates to an ion exchange resin, a process for producing the same, and a method for removing impurities from a condensate using the same. More particularly, it relates to a process for producing ion exchange resin beads having a specific surface area of 0.04 m$^2$/g or more, an anion or cation exchange resin produced by the process, and a method for purifying a condensate such as primary cooling water for the core of a nuclear reactor and a condensate of steam generated in a nuclear reactor.

BACKGROUND OF THE INVENTION

Ion exchange resin beads are used as an anion or cation exchanger in many applications, such as water treatment, production of pure water, catalysts, and purification of sugar solutions. Ion exchange resins for use in these applications and copolymers to be converted ion exchange resins generally include a gel type resin having a non-porous structure and a macroporous type resin having a porous or macro-network structure. Superiority of the ion exchange resins of gel type to those of porous type resides in higher physical strength as represented by friability and higher exchange capacity. Superiority of the porous type ion exchange resins to those of gel type resides in higher physical stability as represented by osmotic pressure resistance and higher rate of ion-exchange reaction owing to their greater specific surface area in contact with a substance to be treated. Having a porous or macro-network structure, the macroporous type ion exchange resins are also useful for water treatment or removal of impurities from stock water for the production of pure water.

However, structurally lacking in exchange capacity and physical strength as compared with gel type ion exchange resins, the macroporous type ion exchange resin beads are liable to destruction by various stresses exerted thereon under conditions of use.

In order to overcome the respective disadvantages of the conventional ion exchange resins, there has been proposed a two-stage polymerization process for producing an ion exchange resin possessing advantageous characteristics of both gel type and porous type resins or a copolymer capable of providing such an ion exchange resin, comprising swelling a crosslinked copolymer having a macro-network structure with a monofunctional monomer and a polyfunctional monomer by imbibing and then polymerizing the monomers, as disclosed, e.g., in JP-B-48-17988 (the term "JP-B" as used herein means an "examined Japanese patent publication") and U.S. Pat. No. 3,991,017. However, when a functional group is introduced into the thus produced crosslinked copolymer by known techniques, an ion exchange resin having as much strength as can reasonably be expected from the total degree of crosslinking cannot be obtained. This appears to be because the monofunctional monomer and the polyfunctional monomer imbibed and filled into pores of the crosslinked copolymer having a macro-network structure has a weak interaction with the crosslinked copolymer and also because the imbibing is non-uniform only to produce a non-uniform crosslinked copolymer.

Examples of the water treatments with an ion exchange resins include removal of impurities from a condensate of cooling water for the core of a nuclear reactor or a condensate of the steam generated in the reactor. For example, in boiling water reactors (hereinafter abbreviated as "BWR") where highly purified water must be used as a primary coolant, several devices for purifying the spent water are provided in the course of the circulation equipment so that the water should be repeatedly used.

For better understanding, a basic construction of BWR is explained below by referring to FIG. 1. The steam generated in reactor 1 is forwarded to turbine 3 through main steam pipe 2. After working, the steam is transferred to condenser 4 where it is condensed. The condensate is then forwarded to condensate purifying apparatus 5 by pump 6. The thus purified water is fed to feedwater heater 8 by pump 7 where it is heated. Most of the heated water is supplied to reactor 1 through water pipe 9, while a part of the heated water is sent to condensate purifying apparatus 11 provided on reactor recirculation line 10.

Nuclear-power generation of the above-described type requires a large quantity of water having extremely high purity for reducing radioactivity induction. Criteria of water quality for nuclear-power generation are as follows.

| Item | Criteria |
| --- | --- |
| Conductivity (at 25° C.) | <0.1 μΩ/cm |
| Metallic impurities | <15 ppb |
| Chloride ion | <1 ppb |

Since general tap water contains about 10 ppm of metals, it must be purified about 1000-fold so as to reduce the metals below 15 ppb. The condensate additionally contains trace amounts of metallic impurities released from the nuclear power plant. Such metallic impurities include ionic impurities and noinionic impurities called clad mainly composed of amorphous iron hydroxide and iron oxyhydroxide. These impurities are generally removed in a condensate purifying apparatus (e.g., as shown by numerals 5 and 11 in FIG. 1) using a demineralizer with an inlet and an outlet which is filled with a basic ion exchange resin and an acidic ion exchange resin.

Resins conventionally employed in such a condensate purifying apparatus are gel type ion exchange resins having a particle size of from about 0.1 to 1 mm and a specific surface area of about 0.03 m$^2$/g. The conventional ion exchange resins have a sufficient amount of ion exchange groups for removing ionic impurities in the condensate, and the thus purified water fulfills the above-specified criteria in most cases. However, nonionic impurities such as clad are difficult to remove with ion exchange resins, and some of the conventional gel type ion exchange resins attain a very low rate of removal of the nonionic impurities. Should the nonionic impurities remain in the condensate, they are activated in the reactor or adhered to the reactor to increase the radiation dose, and thus, removal of the nonionic impurities is of great importance. In particular, a fresh ion exchange resin has a small specific surface area and has therefore a small capacity of removing clad and particularly a low rate of removal. An old resin having been used for 3 to 4 years has an increased capacity of removal of clad probably due to swelling of the surface and so increased specific surface area.

It is known, on the other hand, that an ion exchange resin having its surface roughened through oxidation treatment or mechanical abrasion and thereby having an increased specific surface area is suitable for removal of clad as taught in JP-A-2-273550 and JP-A-2-307534. This is because clad, which mainly composed of amorphous iron hydroxide or iron oxyhydroxide and are therefore difficult to remove with an ion exchange resin, is easily dissolved in an acidic atmosphere created on the surface of an ion exchange resin to become an iron ion which is ready to be trapped on the surface of the ion exchange resin. Since the resin once catches an iron ion on the surface thereof, it is important for the resin to have an ability of entrapping the iron into the inside thereof. However, the above-described resin having its surface roughened by oxidation treatment is disadvantageous in that the strength is lessened by oxidation treatment and that the oxidation treatment is no more than accelerated deterioration, i.e., making the surface of the ion exchange resin particles substantially old like after repeated use. On the other hand, a porous type resin, although having a large specific surface area, has too small strength to withstand use in place of the gel type resin.

U.S. Pat. No. 4,564,644 discloses a gel type resin having a core/shell structure, and U.S. Pat. No. 4,975,201 proposes to use this resin for removal of clad from a condensate. Such a resin includes, as illustrated in the working examples, a styrene-divinylbenzene copolymer skeleton having bonded thereto an ion exchange group, the skeleton resin being produced by imbibing a monomer mixture of styrene, divinylbenzene, and a free radical initiator into seed particles of a styrene-divinylbenzene copolymer, polymerizing from 40 to 95% of the absorbed monomers within the seed particles, and then continuously adding thereto a styrene monomer containing substantially no free radical initiator under such a condition that the styrene monomer be absorbed into the copolymer particles and polymerized therein. It is stated that such an ion exchange resin has high strength and stability against osmotic pressure and is therefore suited for use in treatment of a condensate from a BWR reactor. Nevertheless, production of the resin having such a core/shell structure in which the polymer composition gradually varies from the center to the outer surface involves about three different polymerization steps each requires proper control of the degree of polymerization. In particular, the third step of polymerization must be carried out by adding a monomer in small portions under a constant condition.

SUMMARY OF THE INVENTION

An object of the present invention is to provide an ion exchange resin having a large specific surface area while exhibiting high physical strength and capable of removing impurities both ionic and nonionic substances from a condensate.

Another object of the present invention is to provide a process for producing the ion exchange resin.

A further object of the present invention is to provide a method for removing impurities from a condensate by means of the ion exchange resin.

Other objects and effects of the present invention will be apparent from the following description.

The present invention relates to a process for producing an ion exchange resin having a specific surface area of at least 0.04 m$^2$/g, which process comprises the steps of: (1) uniformly imbibing a monomer mixture comprising a bifunctional unsaturated aromatic monomer and a monofunctional unsaturated aromatic monomer into aromatic crosslinked copolymer particles comprising a monofunctional unsaturated aromatic monomer and a bifunctional unsaturated aromatic monomer and having a porosity of not more than 0.2 ml/g; (2) polymerizing the monomer mixture in the presence of a polymerization initiator; and (3) introducing an ion exchange group into the resulting copolymer particles.

The present invention also relates to an ion exchange resin having specific surface area of at least 0.04 m$^2$/g produced by the above process.

The present invention further relates to a method for removing ionic metallic impurities and nonionic metallic impurities from a condensate by means of a purifying apparatus packed with the above ion exchange resin.

DETAILED DESCRIPTION OF THE INVENTION

Figure 1:
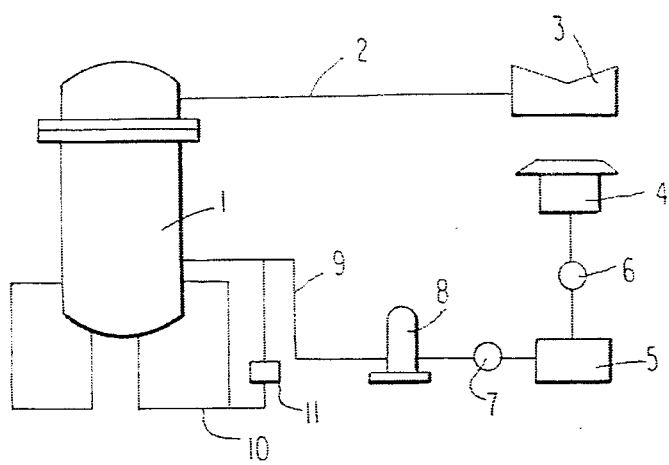
FIG. 1 shows a basic construction of a boiling water reactor plant.

The aromatic crosslinked copolymer particles which is used as seed particles in the present invention comprise a monofunctional unsaturated aromatic monomer and a bifunctional unsaturated aromatic monomer and have a porosity (volume of pores per unit weight) of not more than 0.2 ml/g.

Macro-network type crosslinked copolymers produced by conventional processes generally have a porosity of more than 0.2 ml/g, although depending on various production conditions such as the amount of an organic solvent used as a precipitating medium. The present inventors have found that the porosity can be reduced to 0.2 ml/g or less by once preparing an aromatic copolymer having a macro-network structure which contains not more than 10% by weight, based on the total amount of the repeating units, of a repeating unit derived from the bifunctional unsaturated aromatic monomer in accordance with a known process and then subjecting the copolymer to heat treatment. Accordingly, the crosslinked copolymer seed particles to be used in the present invention include both of those directly obtained by properly selecting production conditions and those obtained by subjecting a conventional copolymer to heat treatment.

The crosslinked copolymer particles having a macro-network structure can be prepared principally according to known techniques, with suspension polymerization being preferred.

Examples of monofunctional unsaturated aromatic monomers which can be used in the present invention and are suitable for suspension polymerization include monovinylbenzene and monovinylnaphthalene, which may have a substituent selected from an alkyl group having from 1 to 4 carbon atoms or a halogen atom. Among these, styrene, vinylnaphthalene, and styrene substituted with an alkyl group preferably having from 1 to 4 carbon atoms or a halogen atom, e.g., α-methylstyrene, vinyltoluene, vinylxylene, chlorostyrene, and chloromethylstyrene, are preferred, with styrene being more preferred.

Examples of bifunctional unsaturated aromatic monomers which can be used in combination with the monofunctional unsaturated aromatic monomer and have crosslinking properties include divinylbenzene and divinylnaphthalene which may have a substituent selected from a lower alkyl group preferably having from 1 to 4 carbon atoms. Among these, divinylbenzene, divinylnaphthalene, divinylxylene, and divinylethylbenzene, with divinylbenzene being more preferred.

The proportion of the repeating unit derived from the bifunctional aromatic monomer having crosslinking properties in the copolymer is preferably not more than 10% by weight, and more preferably from 3 to 8% by weight, based on the total weight of the monofunctional aromatic monomer and the bifunctional aromatic monomer. That is, the proportion of the repeating unit derived from the bifunctional aromatic monomer in the crosslinked copolymer is preferably not more than 10% by weight, and more preferably from 3 to 8% by weight, based on the total amount of the crosslinked copolymer.

Where a crosslinked copolymer is subjected to heat treatment (hereinafter described in detail) so as to have a controlled porosity, the effect of the heat treatment is manifested with the proportion of the repeating unit derived from the bifunctional aromatic monomer being not more than 10% by weight. If the proportion of the repeating unit derived from the bifunctional aromatic monomer exceeds 10% by weight, no effect may be produced by the heat treatment. If the proportion of the repeating unit derived from the bifunctional aromatic monomer is less than 0.5% by weight, the resulting copolymer tends to have a low crosslinking density, failing to exhibit insolubilizing effects sufficient for practical use.

If desired, the crosslinked copolymer particles may further contain aliphatic monomers or heterocyclic monomers as comonomers in addition to the above-described aromatic monomers. Examples of the comonomers include monofunctional or bifunctional, heterocyclic or aliphatic compounds, such as acrylonitrile, acrylic acid, acrylic esters (e.g., methyl acrylate), methacrylic acid, methacrylic esters (e.g., methyl methacrylate), ethylene glycol dimethacrylate, vinylpyridine, divinylpyridine, vinylquinoline, and divinylquinoline. These comonomers may be used either individually or in combination of two or more thereof. The heterocyclic or aliphatic comonomers are generally used in a proportion of from 0 to 20% by weight based on the total amount of the monomers.

The porous crosslinked copolymer seed particles can be obtained by polymerizing these monomers in a suspension medium in the presence of a precipitating medium functioning to make the particles porous. Useful precipitating media includes substances which serve as a solvent for the monomers and as a non-solvent or poor solvent for the produced crosslinked copolymer and are chemically inert to the reaction product and the suspension medium under the polymerization conditions. Generally used are organic substances having a boiling point of 60° C. or higher, and preferably aliphatic hydrocarbons, e.g., isooctane and hexane; aromatic hydrocarbons, e.g., benzene, toluene, and xylene; and halogenated hydrocarbons, e.g., ethylene dichloride and ethylene bromide. These precipitating media have commonly been employed in an amount ranging from 10 to 60% by weight, while, in the present invention, they are generally used in an amount of from 50 to 150% by weight, based on the aromatic monomer mixture.

The precipitating medium may contain a non-crosslinked linear polymer such as polystyrene in an amount of from 0.5 to 20% by weight based on the precipitating medium.

The porous crosslinked copolymer seed particles used in the present invention may also be prepared by copolymerizing the monofunctional and bifunctional monomers in the presence of a non-crosslinked linear polymer, e.g., polystyrene, polymethylstyrene, polyacrylate, polymethacrylate, polyethylene glycol, and polyvinyl acetate. Such a linear polymer generally has a weight average molecular weight between 5,000 and 50,000, and preferably between 10,000 and 100,000. The linear polymer is used in an amount generally of from 1 to 100% by weight, and preferably of from 2 to 30% by weight, based on the total amount of the monomer mixture.

Where copolymerization is performed in the presence of the non-crosslinked linear polymer, it is likely that the resulting copolymer particles have a porosity of not more than 0.2 ml/g.

The polymerization is usually carried out in the presence of a polymerization catalyst (polymerization initiator) providing a free radical serving as an initiator. Examples of the polymerization catalysts include benzoyl peroxide, t-butyl hydroxyperoxide, lauroyl peroxide, and azo compounds, e.g., azobisisobutyronitrile and azobisisovaleronitrile. The catalyst is used in an amount generally of from 0.01 to 5% by weight, and preferably of from 0.05 to 2% by weight, based on the total amount of the monomer mixture.

The polymerization is usually conducted by heating a suspended polymerization system at a temperature of from 60° to 100° C., and preferably of from 70° to 90° C., with stirring until polymerization of monomers completes.

The thus prepared crosslinked copolymer particles having a macro-network structure can be subjected as such to the subsequent imbibing treatment as long as they have a porosity of not more than 0.2 ml/g. If the porosity is more than 0.2 ml/g, the particles must be shrunk by heat treatment so as to have a desired porosity. A preferred porosity is 0.1 ml/g or less.

As stated above, the degree of shrinkage of the porous structure reached by heat treatment is influenced by the content of the bifunctional unsaturated aromatic monomer in the crosslinked copolymer. In general, the smaller the bifunctional monomer content, the greater the degree of shrinkage.

Heat treatment for porosity adjustment is carried out, for example, in accordance with the method disclosed in KOBUNSHI RONBUNSHU, Vol. 46, No. 1, pp. 29-35 (January, 1989). One example of the heat treatment is shown below. 1) solvents which has poor solubility are removed with methanol, 2) polymers are imbibed with ethylene dichloride which is good solvent for the polymers, and then 3) ethylene dichloride is removed by heating at 60° C.

Heat treatment may also be carried out by heating the porous crosslinked copolymer particles in an inert gas stream at a temperature of from 80° to 200° C. for a period of at least 5 hours.

The terminology "heat treatment" as used herein should be distinguished from solvent distillation such as steam distillation. In other words, the heat treatment according to the present invention essentially requires exposure to a relatively high temperature for a sufficiently long period of time so that the whole particles may undergo thermal shrinkage. For instance, when copolymer particles obtained by a usual process for producing porous copolymers and having a volume of 3.6 ml/g (corresponding to a porosity of 1.2 ml/g) are treated in a solvent at 100° C. for 8 hours, the porosity of the resulting particles is 1.0 ml/g. Such a treatment does not meet the purpose of adjusting a porosity to 0.2 ml/g or less before imbibing. A treatment of the same copolymer particles at 200° C. for 5 hours results in reduction of porosity to 0.0 ml/g, which is regarded sufficient as a pretreatment before imbibing.

It is preferable to use crosslinked copolymer particles having been subjected to the above-described heat treatment as seed particles. As a matter of course, the crosslinked copolymer having a porosity of not more than 0.2 ml/g without undergoing the heat treatment is also included in the scope of the present invention.

The thus prepared crosslinked copolymer particles are then uniformly imbibed and swollen with a monomer mixture of a bifunctional unsaturated aromatic monomer and a monofunctional unsaturated aromatic monomer and a polymerization initiator.

Examples of the mono- and bifunctional unsaturated aromatic monomers which can be used for imbibing and are suitable for suspension polymerization and examples of usable polymerization initiators are the same as those mentioned above with respect to the seed particles. A preferred monofunctional unsaturated aromatic monomer is styrene. A preferred bifunctional aromatic monomer is divinylbenzene.

If desired, the monomer mixture to be imbibed may further contain up to 10% by weight of one or more of copolymerizable monomers, such as heterocyclic monomers, e.g., vinylpyridine and vinylquinoline, and aliphatic monomers, e.g., acrylonitrile, acrylic acid, acrylic esters (e.g., methyl acrylate), methacrylic acid, methacrylic esters (e.g., methyl methacrylate), and ethylene glycol dimethacrylate, based on the total monomer mixture.

The proportion of the bifunctional monomer in the monomer mixture is appropriately selected from the range 1 to 20% by weight based on the total monomers, taking properties of the resulting ion exchange resin into consideration. A preferred proportion of the bifunctional monomer is from 2 to 12% by weight.

Imbibing can be effected by various methods. In a preferred embodiment, the copolymer particles are suspended in water, and the monomer mixture is added thereto while stirring. While an imbibed amount of the monomer mixture is limited by the maximum absorpability of the copolymer particles, the monomer mixture is generally imbibed in an amount of from 10 to 200% by weight, and preferably from 50 to 150% by weight, based on the amount of the copolymer particles.

The copolymer particles sufficiently imbibed with the monomer mixture and an initiator is then heated at a temperature of from 70° to 90° C. to conduct polymerization, washed with water, and then dried. It is assumed that the thus obtained crosslinked copolymer has an interpenetrating polymer network structure (hereinafter abbreviated as an "IPN structure") as compared with that obtained by using a crosslinked copolymer having a macro-network structure of large porosity. The details of the IPN structure, as described, e.g., in J. R. Miller, *J. Chem. Soc.*, p. 1311 (1960).

The resulting copolymer can be converted to a cation or anion exchange resin by incorporating an ion-exchange functional group in a conventional manner. Introduction of a cation-exchange group can be achieved, for example, by reacting the copolymer with a sulfonating reagent, e.g., sulfuric acid, fuming sulfuric acid, and chlorosulfonic acid, in the presence of a swelling solvent, e.g., dichloroethane, dichloropropane, nitrobenzene, and nitromethane, as disclosed in F. Helfferich, *Ion Exchange*, MacGraw-Hill Book Co. (1962). Introduction of an anion-exchange group can be achieved by, for example, haloalkylating the copolymer and then reacting the haloalkylated copolymer with a tertiary amine to introduce a quaternary ammonium group as disclosed in the same publication.

The haloalkylating reaction can be carried out by reacting the copolymer with a haloalkylating agent, e.g., chloromethyl methyl ether, chloroethyl methyl ether, chloromethyl ethyl ether, bromomethyl methyl ether, bromoethyl methyl ether, and bromomethyl ethyl ether, in the presence of a catalyst, e.g., zinc chloride, anhydrous aluminum chloride, tin chloride, and iron chloride, in the absence or presence of an organic solvent capable of swelling a copolymer of a monovinyl aromatic compound and a polyvinyl compound, e.g., ethylene dichloride, benzene, toluene, and propylene dichloride.

The haloalkylating reaction may also be performed by reacting the copolymer with a solution consisting of hydrochloric acid or a chlorine-containing reagent, e.g., chlorosulfuric acid, sulfuryl chloride, thionyl chloride, acyl chloride, phosphorus trichloride, phosphorus pentachloride, and aluminum chloride, an alcohol, e.g., methanol, and formalin or a formalin precursor capable of forming formalin during the reaction, e.g., paraformaldehyde and trioxan.

Examples of the tertiary amines include tri-lower alkylamines having from 1 to 4 carbon atoms in the alkyl moiety thereof and di-lower alkyl-lower alkanolamines, e.g., trimethylamine, triethylamine, tripropylamine, tributylamine, dimethylethanolamine, and monomethyldiethanolamine. These tertiary amines may be used either individually or in combination thereof.

The resulting ion exchange resin generally has an ion exchange capacity of from 3.5 to 5.0 meq/g.

The ion exchange resin according to the present invention has high physical strength and a specific surface area of 0.04 $m^2/g$ or more.

The ion exchange resin of the present invention comprises a porous type resin having filled in the inside thereof a gel type resin. That is, since the ion exchange resin possesses properties of both porous type and gel type ion exchange resins, it has a large specific surface area and high strength. Therefore, the ion exchange resin of the present invention is suitable for removal of nonionic impurities called clad as well as ionic impurities from a condensate of a nuclear power plant.

Purification of a condensate by use of the ion exchange resin according to the present invention can be achieved by passing the steam generated in a nuclear reactor or primary cooling water of a nuclear reactor through the ion exchange resin packed in a condensate purifying apparatus. The method of condensate purification according to the present invention is applicable to either of the condensate filters of the nuclear power system shown by numerals 5 and 11 in FIG. 1 and also to condensate purifying apparatus of any other systems. For particular use in nuclear power systems, preferred is an ion exchange resin obtained by imbibing the seed copolymer particles with a monomer mixture containing from 2 to 12% by weight of the bifunctional aromatic unsaturated monomer.

Condensate purification is usually conducted by using a mixed bed composed of a strongly basic anion exchange resin and a strongly acidic cation exchange resin. While the ion exchange resin of the present invention include both a cation exchange resin and an anion exchange resin, the former is pre-eminent over the latter in ability of removing clad, most of the clad is adsorbed onto a strongly acidic cation exchange resin in the above-described condensate purifying apparatus. Accordingly, the ion exchange resin of the present invention is mainly utilized as a cation exchange resin, particularly a strongly acidic cation exchange resin usually having a sulfo group as an ion exchange group, and a commercially available anion exchange resin can be used in combination.

Packing of the ion exchange resin in a condensate purifying apparatus can be carried out in a conventional manner.

The present invention is now illustrated in greater detail by way of Examples, but it should be understood that the present invention is not construed as being limited thereto.

EXAMPLE 1

(a) Preparation of Seed Copolymer Particles

In a 1 l polymerization vessel were charged 600 g of deionized water and 1 g of a suspension stabilizer. To the aqueous phase was added an organic phase consisting of 109 g of styrene, 7.3 g of divinylbenzene of commercial grade (purity: 55%), and 105 g of iso-octane. The resulting suspension was stirred in a nitrogen stream at 80° C. to conduct polymerization. After polymerization, isooctane was removed by steam distillation. After washing, the produced copolymer was heat-treated at 150° C. for 5 hours in a nitrogen stream. The porosity of the copolymer particles as measured with a mercury porosimeter before and after the heat treatment was found to be 1.2 ml/g and 0.0 ml/g, respectively.

(b) Preparation of Copolymer

In a 1 l polymerization vessel was charged an aqueous phase consisting of 300 g of deionized water and 0.015 g of a suspension stabilizer, and 50 g of the seed particles prepared in (a) above was suspended therein with stirring. An organic phase consisting of 46.5 g of styrene, 3.5 g of divinylbenzene of commercial grade, and 0.25 g of benzoyl peroxide was added to the suspension so that the seed particles were sufficiently imbibed and swollen with the organic phase. The system was kept at 80° C. for 8 hours while stirring in a nitrogen stream to conduct polymerization. After thoroughly washing with water, the copolymer was collected by filtration and dried in vacuo at 80° C. for 8 hours.

c) Preparation of Cation Exchange Resin

In a 1 l four-necked flask, 30 g of the dry copolymer obtained in (b) was sufficiently swollen with 90 g of 1,2-dichloroethane. To the mixture was added 450 g of 95% sulfuric acid, followed by heating at 80° C. for 8 hours with stirring to obtain about 170 ml (in a water-swollen state) of a strongly acidic cation exchange resin having a sulfo group (—SO$_3$H) as a functional group.

(d) Performance Properties of Cation Exchange Resin

The above-prepared strongly acidic cation exchange resin had an exchange capacity of 4.66 meq/g (Na$^+$ type functional group).

The strongly acidic cation exchange resin having a sulfo group as a functional group and having been vacuum dried at 80° C. for 8 hours had a specific surface area of 0.124 m$^2$/g as calculated from krypton gas adsorbed thereon.

The friability of the cation exchange resin was 400 g/particle in average. The measurements were made with Chatillon (a dial push-pull model DPP, manufuctured by John Chatillon & Sons Inc.) on 60 particles having a diameter of 600 μm.

Figure 2:
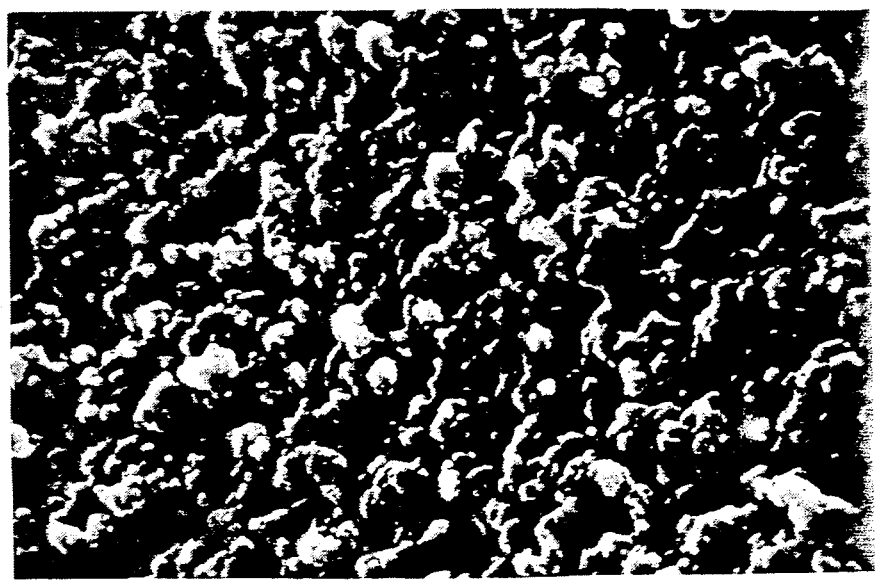
FIG. 2 is an electron micrograph showing the surface of the strongly acidic cation exchange resin obtained in Example 1 (magnification: 6,000).

The surface of the strongly acidic cation exchange resin having a sulfo group and having been vacuum dried at 80° C. for 8 hours was observed under a scanning electron microscope. The electron micrograph is shown in FIG. 2 (magnification: 6,000). Further, observation of the cross section of the same sample under a scanning electron microscope (magnification: 300) revealed a uniform phase in the inside of the particle as observed with a gel type resin.

The strongly acidic cation exchange resin is capable of removing clad as well as ionic impurities when applied to condensate purifying apparatus 5 and 11 of FIG. 1.

(e) Preparation of Anion Exchange Resin and Performance Properties Thereof

In a 500 ml four-necked flask were charged 15 g of the dry copolymer particles prepared in (b), 45 g of chloromethyl methyl ether, and 7.5 g of zinc chloride. The mixture was stirred at room temperature for 30 minutes and then heated at 50° C. for 8 hours. The resulting resin was collected and washed with water, and the water was thoroughly drained off. The yield of the wet resin was 25 g. A 20 g portion of the resin was put in a 500 ml four-necked flask, and 23 ml of 30% trimethylamine was added thereto, followed by heating at 50° C. for 8 hours while stirring, to obtain 33 ml of an anion exchange resin (Cl$^-$ type functional group) in a water-swollen state. The ion exchange capacity was found to be 4.13 meq/g.

COMPARATIVE EXAMPLE 1

Figure 3:
FIG. 3 is an electron micrograph showing the surface of a commercially available ion exchange resin (magnification: 6,000).

For the sake of comparison with the strongly acidic ion exchange resin obtained in Example 1, the surface of a commercially available gel type ion exchange resin, DIAION SK104H (a gel type strong cation exchange resin (styrene-4% divinylbenzene), manufactured by Mitsubishi Kasei Corporation), conditioned in the same manner as in Example 1, was observed under a scanning electron microscope. The micrograph is shown in FIG. 3 (magnification: 6,000). The scratch appearing on the resin surface of FIG. 3 is the one intentionally made for the purpose of making the surface state clearly distinguishable from FIG. 2. It is seen that the gel type ion exchange resin has a very smooth surface as shown in FIG. 3, whereas the strongly acidic cation exchange resin prepared in Example 1 has a rough surface as shown in FIG. 2.

EXAMPLE 2

(a) Preparation of Seed Resin Particles

In a 1 l polymerization vessel were charged 600 g of deionized water and 1 g of a suspension stabilizer. To the aqueous phase was added an organic phase consisting of 111.5 g of styrene, 8.5 g of divinylbenzene of commercial grade, and 24 g of linear polystyrene having a weight average molecular weight of 90,000. The resulting suspension was stirred in a nitrogen stream at 80° C. to conduct polymerization. After polymerization, the linear polystyrene was removed by extraction with toluene. After washing, the produced copolymer was heat-treated at 150° C. for 5 hours in a nitrogen stream. The porosity of the copolymer particles as measured with a mercury porosimeter before and after the heat treatment was found to be 0.20 ml/g and 0.0 ml/g, respectively.

(b) Preparation of Copolymer

The polymer particles obtained in (a) above were treated in the same manner as in (b) of Example 1.

(c) Preparation of Cation Exchange Resin

The copolymer obtained in (b) above was treated in the same manner as in (c) of Example 1 to obtain about 150 ml (in a water-swollen state) of a strongly acidic cation exchange resin having a sulfo group as a functional group. The ion exchange capacity of the resin was 4.60 meq/g (Na+ type functional group).

The resulting strongly acidic cation exchange resin having a sulfo group and having been vacuum dried at 80° C. for 8 hours had a specific surface area of 0.117 m$^2$/g as measured in the same manner as in Example 1.

EXAMPLE 3

Copolymer particles were prepared in the same manner as in (b) of Example 1, except that a mixture of 62.4 g of styrene, 7.6 g of divinylbenzene and 0.35 g of benzoyl peroxide was used as an organic phase imbibed into the seed polymer perticles.

The copolymer particles thus obtained were treated in the same manner as in (c) of Example 1, whereby a cation exchange regin having an ion exchange capacity of 4.67 meq/g, a friability of 540 g/particle and a specific surface area of 0.192 m$^2$/g was obtained.

EXAMPLE 4

Copolymer particles were prepared in the same manner as in (b) of Example 1, except that a mixture of 106 g of styrene, 10.6 g of divinylbenzene and 70 g of isooctane was used as an organic phase imbibed into the seed polymer particles.

The copolymer particles thus obtained were treated in the same manner as in (c) of Example 1, whereby a cation exchange resin having of an ion exchange capacity of 4.62 meq/g, a friability of 1270 g/particle and a specific surface area of 0.127 m$^2$/g was obtained.

While the invention has been described in detail and with reference to specific examples thereof, it will be apparent to one skilled in the art that various changes and modifications can be made therein without departing from the spirit and scope thereof.

What is claimed is:

1. A process for producing an ion exchange resin having a specific surface area of at least 0.04 m$^2$/g, said process comprising the steps of: (1) preparing aromatic crosslinked copolymer particles by heat treating, at a temperature of from 80° to 200° C., aromatic crosslinked copolymer particles comprising a monofunctional unsaturated aromatic monomer and a bifunctional unsaturated aromatic monomer, containing a repeating unit derived from said bifunctional unsaturated aromatic monomer in a proportion of not more than 10% by weight based on the total amount of the repeating units, and having a porosity of more than 0.2 ml/g so as to reduce the porosity to 0.2 ml/g or less; (2) uniformly imbibing a monomer mixture comprising a bifunctional unsaturated aromatic monomer and a monofunctional unsaturated aromatic monomer into said aromatic crosslinked copolymer particles comprising said monofunctional unsaturated aromatic monomer and said bifunctional unsaturated aromatic monomer and having said porosity of not more than 0.2 ml/g; (3) polymerizing the monomer mixture in the presence of a polymerization initiator; and (4) introducing an ion exchange group into the resulting copolymer particles.

2. A process as claimed in claim 1, wherein said monofunctional unsaturated aromatic monomer is at least one compound selected from monovinylbenzene and monovinylnaphthalene, which may have a substituent selected from an alkyl group having from 1 to 4 carbon atoms and a halogen atom.

3. A process as claimed in claim 2, wherein said monofunctional unsaturated aromatic monomer is at least one compound selected from the group consisting of styrene, vinylnaphthalene, vinyltoluene, vinylxylene, and chlorostyrene.

4. A process as claimed in claim 3, wherein said monofunctional unsaturated aromatic monomer is styrene.

5. A process as claimed in claim 1, wherein said bifunctional unsaturated aromatic monomer is at least one compound selected from divinylbenzene and divinylnaphthalene which may have a substituent selected from an alkyl group having from 1 to 4 carbon atoms.

6. A process as claimed in claim 5, wherein said bifunctional unsaturated aromatic monomer is at least one compound selected from divinylbenzene, divinylnaphthalene, divinylxylene, and divinylethylbenzene.

7. A process as claimed in claim 6, wherein said bifunctional unsaturated aromatic monomer is divinylbenzene.

8. A process as claimed in claim 1, wherein said repeating unit derived from the bifunctional unsaturated aromatic monomer is present in a proportion of from 3 to 8% by weight based on the total amount of the repeating units.

9. A process as claimed in claim 1, wherein said aromatic crosslinked copolymer particles are those prepared by copolymerizing a monofunctional unsaturated aromatic monomer and a bifunctional unsaturated aromatic monomer in the presence of a suspension medium, an organic precipitating medium having a boiling point of 60° C. or higher which serves as a solvent for the monomers and also serves as non-solvent or a poor solvent for the produced crosslinked copolymer so as to precipitate the produced crosslinked copolymer as porous particles and which is chemically inert to the produced crosslinked copolymer and the suspension medium under the polymerization conditions, and a polymerization initiator.

10. A process as claimed in claim 9, wherein said precipitating medium is selected from the group consisting of iso-octane, hexane, benzene, toluene, xylene, ethylene dichloride, and ethylene bromide.

11. A process as claimed in claim 9, wherein said precipitating medium is present in an amount of from 50 to 150% by weight based on the amount of the mixture of said monofunctional unsaturated aromatic monomer and bifunctional unsaturated aromatic monomer.

12. A process as claimed in claim 1, wherein the heat-treated aromatic crosslinked copolymer particles has a porosity of not more than 0.1 ml/g.

13. A process as claimed in claim 1, wherein said mixture comprising a bifunctional unsaturated aromatic monomer and a monofunctional unsaturated aromatic monomer is imbibed into said aromatic crosslinked copolymer particles in an amount of from 10 to 200% by weight based on the amount of said crosslinked copolymer particles.

14. A process as claimed in claim 13, wherein said mixture comprising a bifunctional unsaturated aromatic monomer and a monofunctional unsaturated aromatic monomer is imbibed into said aromatic crosslinked copolymer particles in an amount of from 50 to 150% by weight based on the amount of said crosslinked copolymer particles.

15. A process as claimed in claim 1, wherein said ion exchange group is a sulfo group.

16. A process as claimed in claim 1, wherein said ion exchange group is a quaternary ammonium group.

17. A process as claimed in claim 1, wherein said aromatic crosslinked copolymer particles are those prepared by copolymerizing a monofunctional unsaturated aromatic monomer and a bifunctional unsaturated aromatic monomer in the presence of a non-crosslinked linear polymer having a weight average molecular weight of from 5,000 to 500,000 and a polymerization initiator.

18. A process as claimed in claim 17, wherein said non-crosslinked linear polymer is selected from polystyrene, polymethylstyrene, polyacrylate, polymethacrylate, polyethylene glycol, and polyvinyl acetate.

19. A process as claimed in claim 17, wherein said linear polymer is present in an amount of from 50 to 150% by weight based on the total weight of said monofunctional unsaturated aromatic monomer and bifunctional unsaturated aromatic monomer.

20. An ion exchange resin having a specific surface area of at least 0.04 m$^2$/g which is produced by a process comprising the steps of: (1) heat treating aromatic crosslinked copolymer particles comprising a monofunctional unsaturated aromatic monomer and a bifunctional unsaturated aromatic monomer, containing a repeating unit derived from said bifunctional unsaturated aromatic monomer in a proportion of not more than 10% by weight based on the total amount of the repeating units, and having a porosity of more than 0.2 ml/g, so as to reduce the porosity to 0.2 ml/g or less; (2) uniformly imbibing a monomer mixture comprising a bifunctional unsaturated aromatic monomer and a monofunctional unsaturated aromatic monomer into the heat-treated aromatic crosslinked copolymer particles having a porosity of not more than 0.2 ml/g; (3) polymerizing the monomer mixture in the presence of a polymerization initiator; and (4) introducing an ion exchange group into the resulting copolymer particles.

21. A method for removing ionic metallic impurities and noinionic metallic impurities from a condensate by means of a purifying apparatus packed with an ion exchange resin, said ion exchange resin being an ion exchange resin having a specific surface area of at least 0.04 m$^2$/g which is produced by a process comprising the steps of: (1) heat treating aromatic crosslinked copolymer particles comprising a monofunctional unsaturated aromatic monomer and a bifunctional unsaturated aromatic monomer, containing a repeating unit derived from said bifunctional unsaturated aromatic monomer in a proportion of not more than 10% by weight based on the total amount of the repeating units, and having a porosity of more than 0.2 ml/g, so as to reduce the porosity to 0.2 ml/g or less; (2) uniformly imbibing a monomer mixture comprising a bifunctional unsaturated aromatic monomer and a monofunctional unsaturated aromatic monomer into the heat-treated aromatic crosslinked copolymer particles having a porosity of not more than 0.2 ml/g; (3) polymerizing the monomer mixture in the presence of a polymerization initiator; and (4) introducing an ion exchange group into the resulting copolymer particles.

22. A method as claimed in claim 21, wherein said purifying apparatus comprises a mixed bed comprising a strongly basic ion exchange resin and a strongly acidic ion exchange resin, and said ion exchange resin having a specific surface area of at least 0.04 m$^2$/g is used as at least said strongly acidic ion exchange resin.

23. A method as claimed in claim 21, wherein said purifying apparatus comprises a mixed bed comprising a strongly basic ion exchange resin and a strongly acidic ion exchange resin, and said ion exchange resin having a specific surface area of at least 0.04 m$^2$/g is used as at least said strongly acidic ion exchange resin.

* * * * *